(12) United States Patent
Taniguchi et al.

(10) Patent No.: US 9,156,212 B2
(45) Date of Patent: Oct. 13, 2015

(54) TIRE PUNCTURE REPAIR KIT

(75) Inventors: Norio Taniguchi, Kobe (JP); Tsutomu Kono, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/240,247

(22) PCT Filed: Sep. 6, 2012

(86) PCT No.: PCT/JP2012/072719
§ 371 (c)(1),
(2), (4) Date: Feb. 21, 2014

(87) PCT Pub. No.: WO2013/042545
PCT Pub. Date: Mar. 28, 2013

(65) Prior Publication Data
US 2014/0209208 A1    Jul. 31, 2014

(30) Foreign Application Priority Data

Sep. 20, 2011    (JP) ................... 2011-204967

(51) Int. Cl.
*B29C 73/02*    (2006.01)
*B29C 73/16*    (2006.01)
*B29L 30/00*    (2006.01)

(52) U.S. Cl.
CPC .............. *B29C 73/025* (2013.01); *B29C 73/166* (2013.01); *B29L 2030/00* (2013.01)

(58) Field of Classification Search
CPC ...... B29C 73/025; B29C 73/16; B29C 73/166
USPC ................ 141/37, 38, 67, 105, 383
See application file for complete search history.

(56) References Cited

U.S. PATENT DOCUMENTS

| 2,731,195 A | * | 1/1956 | Blome | 141/383 |
| 3,515,181 A | * | 6/1970 | Sperberg | 141/38 |
| 3,669,159 A | * | 6/1972 | Owens, Jr. | 141/1 |

(Continued)

FOREIGN PATENT DOCUMENTS

| EP | 528216 A1 * | 2/1993 | B67C 3/28 |
| EP | 2 123 432 A1 | 11/2009 | |

(Continued)

OTHER PUBLICATIONS

Search Report dated Apr. 1, 2015 for European Application No. 12832880.4.

*Primary Examiner* — Timothy L Maust
*Assistant Examiner* — Andrew Schmid
(74) *Attorney, Agent, or Firm* — Birch, Stewart, Kolasch & Birch, LLP

(57) ABSTRACT

The invention allows the relaxation of the precision of fitting the inner lid to the cap body while making removal of the inner lid more reliable. In the bottle unit of the tire puncture repair kit that has an extraction cap attached to the mouth portion of the bottle container, the extraction cap is provided with: a first flow channel for taking in compressed air from a compressor into the bottle container; a second flow channel for successively taking out the puncture repair liquid and compressed air from the bottle container; and first and second closing means for closing the first and second flow channels in the pre-coupling state. The extraction cap is provided with a release means for releasing the second closing means and opening the second flow channel when connection occurs.

19 Claims, 8 Drawing Sheets

(56) References Cited

U.S. PATENT DOCUMENTS

| | | | |
|---|---|---|---|
| 4,270,585 A * | 6/1981 | Mette | 141/37 |
| 5,924,463 A * | 7/1999 | Hsu et al. | 141/313 |
| 6,019,145 A * | 2/2000 | Savidge | 141/38 |
| 6,283,172 B1 * | 9/2001 | Thurner | 141/38 |
| 6,431,225 B1 * | 8/2002 | Dudley | 141/38 |
| 6,766,834 B1 * | 7/2004 | Eckhardt | 141/38 |
| 6,789,581 B2 * | 9/2004 | Cowan et al. | 141/38 |
| 7,028,720 B2 * | 4/2006 | Eckhardt | 141/38 |
| 7,389,800 B2 * | 6/2008 | Hickman et al. | 141/26 |
| 7,891,385 B2 * | 2/2011 | Yanagi et al. | 141/38 |
| 8,020,588 B2 * | 9/2011 | Wang | 141/38 |
| 8,201,586 B2 * | 6/2012 | Yoshida et al. | 141/37 |
| 8,281,820 B2 * | 10/2012 | White | 141/37 |
| 8,297,321 B2 * | 10/2012 | Chou | 141/38 |
| 8,453,684 B2 * | 6/2013 | Lolli | 141/38 |
| 8,505,591 B2 * | 8/2013 | Eckhardt | 141/38 |
| 8,517,063 B2 * | 8/2013 | Kanenari et al. | 141/38 |
| 8,596,310 B2 * | 12/2013 | Senno et al. | 141/38 |
| 8,627,857 B2 * | 1/2014 | Chou | 141/38 |
| 8,640,745 B2 * | 2/2014 | Ji | 141/38 |
| 8,671,995 B2 * | 3/2014 | Chou | 141/38 |
| 8,684,046 B2 * | 4/2014 | Kojima et al. | 141/38 |
| 8,733,407 B2 * | 5/2014 | Eckhardt | 141/38 |
| 8,746,292 B2 * | 6/2014 | Lolli et al. | 141/38 |
| 8,857,477 B2 * | 10/2014 | Lolli et al. | 141/38 |
| 2003/0024596 A1 * | 2/2003 | Kojima et al. | 141/38 |
| 2005/0284536 A1 * | 12/2005 | Kojima et al. | 141/38 |
| 2006/0272731 A1 * | 12/2006 | Takeda | 141/38 |
| 2008/0264540 A1 * | 10/2008 | Dowel | 152/509 |
| 2009/0301602 A1 * | 12/2009 | Lolli et al. | 141/38 |
| 2010/0071801 A1 * | 3/2010 | Sekiguchi | 141/38 |
| 2010/0108185 A1 * | 5/2010 | Chou | 141/38 |
| 2010/0108186 A1 * | 5/2010 | Yoshida et al. | 141/38 |
| 2010/0186849 A1 * | 7/2010 | Yoshida et al. | 141/38 |
| 2011/0290372 A1 * | 12/2011 | Dowel | 141/37 |
| 2013/0000777 A1 * | 1/2013 | Kojima et al. | 141/38 |
| 2013/0092286 A1 * | 4/2013 | Chou | 141/38 |
| 2013/0199666 A1 * | 8/2013 | Nakao et al. | 141/38 |
| 2013/0284313 A1 * | 10/2013 | Kojima et al. | 141/38 |
| 2014/0099428 A1 * | 4/2014 | Paasch | 427/8 |
| 2014/0190589 A1 * | 7/2014 | Kowalski | 141/38 |
| 2014/0190590 A1 * | 7/2014 | Taniguchi et al. | 141/38 |
| 2014/0209208 A1 * | 7/2014 | Taniguchi et al. | 141/38 |
| 2014/0224380 A1 * | 8/2014 | Kono | 141/37 |
| 2014/0224381 A1 * | 8/2014 | Nakao et al. | 141/37 |
| 2014/0261878 A1 * | 9/2014 | Jhou | 141/38 |
| 2014/0366981 A1 * | 12/2014 | Taniguchi et al. | 141/38 |
| 2015/0000786 A1 * | 1/2015 | Taniguchi et al. | 141/38 |

FOREIGN PATENT DOCUMENTS

| | | |
|---|---|---|
| EP | 2 497 629 A1 | 9/2012 |
| JP | 2007-168418 A | 7/2007 |
| JP | 2008-162070 A | 7/2008 |
| JP | 2009-23123 A | 2/2009 |
| JP | 2010-89273 A | 4/2010 |
| JP | 2010-184354 A | 8/2010 |
| JP | 2011-98463 A | 5/2011 |

* cited by examiner

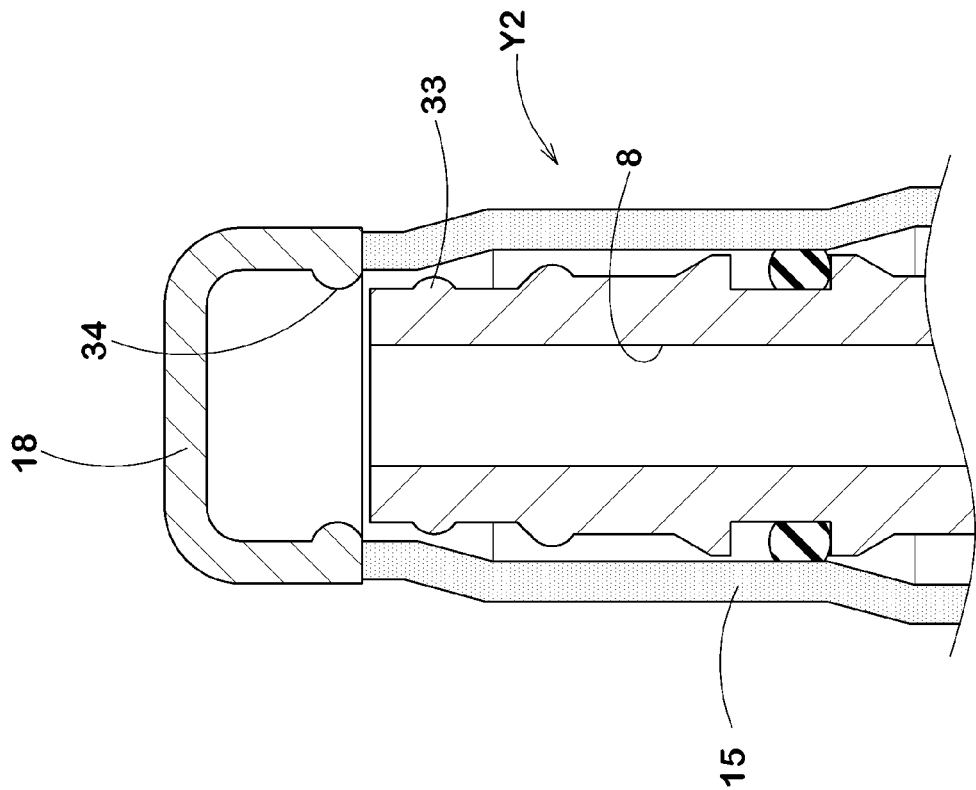
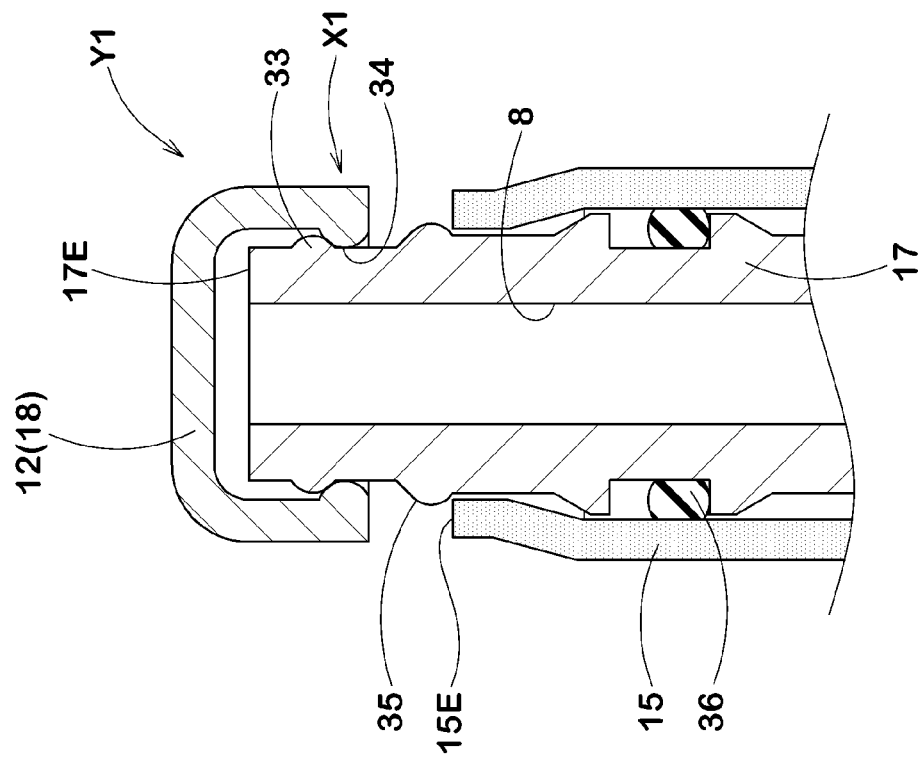

TIRE PUNCTURE REPAIR KIT

TECHNICAL FIELD OF THE INVENTION

The present invention includes a compressor, and a bottle unit with an extraction cap attached to a mouth portion of a bottle container to store a puncture repair liquid therein. The present invention relates to a tire puncture repair kit to sequentially charge the puncture repair liquid and compressed air into a punctured tire to temporarily repair the puncture.

BACKGROUND ART

For example, the following patent document 1 describes a bottle unit (c) for a puncture repair kit with an extraction cap (b) attached to a mouth portion (a1) of a bottle container (a), as shown in FIG. 8.

The extraction cap (b) for use in the bottle unit (c) includes a cap body (g) including a first flow channel (e) and a second flow channel (f), and an inner lid (h) to simultaneously close the first and second flow channels (e) and (f). The first flow channel (e) is to take in the compressed air from (a) compressor (d) into the bottle container (a). The second flow channel (f) is to sequentially take out the puncture repair liquid and the compressed air from the bottle container (a).

Specifically, the cap body (g) includes a boss portion (g2) extending upward from a bottom surface of a fitting recess portion (g1) to screw thereto the mouth portion (a1) of the bottle container (a). Upper opening portions (e1) and (f1) respectively for the first and second flow channels (e) and (f) communicate with an upper surface of the boss portion (g2). The inner lid (h) integrally includes an inner lid body (ha) to fit to an outer peripheral surface of the boss portion (g2), and a plug shank portion (hb) to fit into the upper opening portion (f1).

The bottle unit (c), prior to use, is subjected to on-vehicle storage with the first and second flow channels (e) and (f) closed by the inner lid (h). At the time of a puncture repair, the extraction cap (b) in this state is to be piped to operate the compressor (d). This allows the compressed air to flow through the first flow channel (e) into the inner lid body (ha), and upon an increase in internal pressure therein, the inner lid (h) is to automatically come off to open the first and second flow channels (e) and (f).

Accordingly, the inner lid (h) needs not to come off during the storage, and needs to easily come off under the compressed air at the time of the puncture repair. It therefore becomes necessary to enhance precision in fitting dimension between the inner lid (h) and the cap body (g) to control with high precision an interlocking force between the inner lid (h) and the cap body (g).

However, the conventional structure requires that both the inner lid body (ha) and the plug shank portion (hb) be subjected to fitting, and hence interlocking variations occur in both. Therefore, still higher precision is needed for the fitting dimension, thus causing a drop in yield rate and an increase in process costs for a product inspection process.

Additionally, the inner lid (h) needs simultaneous release in the fitting of the inner lid body (ha) and the fitting of the plug shank portion (hb). For example, when the plug shank portion (hb) is first about to come off to cause a gap, the compressed air in the inner lid body (ha) leaks from the gap to the second flow channel (f). Consequently, the internal pressure of the inner lid body (ha) stops increasing. On the other hand, when the inner lid body (ha) is first about to come off to cause a gap, the compressed air leaks from the gap into the bottle container (a) and the pressure in the bottle container (a) increases. Consequently, a pressure difference between the inside and outside of the inner lid body (ha) is reduced. As a result, in either case, the inner lid (h) does not separate from the boss portion (g2). Thus, the inner lid body (ha) and the plug shank portion (hb) need to come off simultaneously. That is, it is required to ensure the high precision in the fitting dimension between the inner lid body (ha) and the plug shank portion (hb).

RELATED ART DOCUMENTS

Patent Documents

Patent document 1: Japanese Unexamined Patent Application Publication No. 2009-23123.

SUMMARY OF THE INVENTION

Problems to be Solved by the Invention

Accordingly, the present invention has an object to provide a puncture repair kit including release means to release second closing means upon coupling attained when an extraction cap is coupled with a compressor so as to basically permit individual opening of the first and second flow channels. The puncture repair kit is capable of relaxing the fitting precision between the inner lid and the cap body while ensuring separation of the inner lid, thereby capable of suppressing, for example, the drop in yield rate of the extraction cap and the increase in the process costs for the product inspection process.

Means for Solving the Problems

To achieve the above-mentioned object, the invention set forth in claim 1 of the present application characterized in that a puncture repair kit comprising: a compressor configured to discharge compressed air; a bottle unit comprising a bottle container configured to store a puncture repair liquid and an extraction cap attached to a mouth portion of the bottle container; and coupling means for coupling the compressor and the extraction cap of the bottle unit with each other so as to be integrally secured to each other. The extraction cap comprises an inlet portion configured to take in the compressed air from the compressor through a first flow channel into the bottle container, an outlet portion configured to sequentially take out the puncture repair liquid and the compressed air from the bottle container through a second flow channel by an intake of the compressed air, and first and second closing means for respectively closing the first and second flow channels in a pre-coupling state attained by the coupling means. In the inlet portion is defined as a hose connection portion configured to be connectable to one end of a compressed air connection hose comprising another end of which is configured to be connected to the compressor. The extraction cap comprises release means for releasing the second closing means to open the second flow channel upon coupling attained by the coupling means.

In claim 2, the extraction cap comprises a cap body integrally comprising a barrel portion comprising an upper end, a lower end, and a tubular portion therebetween, the upper end configured to fit in the mouth portion of the bottle container, the lower end configured to include a bottom portion, the tubular portion comprising an inner hole communicating with an inside of the bottle container, and a blast pipe extending upward from the bottom portion and coaxially with the tubular portion, the blast pipe comprising a center hole serving as the first flow channel, and a sheath pipe externally inserted in and held on the blast pipe in a vertically slidable manner. And the second closing means is disposed in the sheath pipe so as to be integrally movable with the sheath pipe, and the inlet portion is projected outward on the tubular portion.

In claim 3, the release means comprises a projection piece for release extending from a lower end of the sheath pipe and projecting downward through the bottom portion, and the release means is configured to release the second closing means owing to a fact that the projection piece for release comes into contact with the compressor to push upward the sheath pipe upon the coupling attained by the coupling means.

In claim 4, in the second flow channel comprises an annular vertical flow channel portion defined by a gap between the sheath pipe and the tubular portion, and a lateral flow channel portion configured to communicate via an intersection P with the vertical flow channel portion and extend from the intersection P to a tip opening portion of the outlet portion. And in the tubular portion comprises a large-diameter wall portion allowing the inner hole to define a large diameter, and a small-diameter wall portion configured to communicate via a step portion with a lower side of the large-diameter wall portion, and the large-diameter wall portion is defined at a higher position than the intersection P.

In claim 5, the second closing means comprises upper and lower seal members integrally movably disposed on the sheath pipe and configured to respectively come into contact with the small-diameter wall portion to close the vertical flow channel on a higher side and a lower side than the intersection P, and the upper seal member defines a gap between the upper seal member and the large-diameter wall portion to open the second flow channel when the upper seal member is moved upward beyond the step portion by an upward push against the sheath pipe.

In claim 6, in an upper end of the blast pipe is located higher than a liquid surface of the puncture repair liquid.

In claim 7, the first closing means is an inner lid configured to fit to an upper end portion of the blast pipe to close the first flow channel, and the inner lid is configured to come off to open the first flow channel under internal pressure of the first flow channel generated by the compressed air from the compressor.

In claim 8, the blast pipe comprises a first locking projection projecting with a small height from an outer peripheral surface of the blast pipe at a position retreated from the upper end of the blast pipe, and the inner lid comprises an annular second locking projection projecting with a small height from an inner peripheral surface of the inner lid and extending in a circumferential direction, the second locking projection being climbable over the first locking projection. In the pre-coupling state attained by the coupling means, the inner lid is configured to close the first flow channel in a first engaged state allowing the second locking projection to be engaged with the first locking projection on a lower side of the first locking projection.

In claim 9, the inner lid is configured to be pushed upward from the first engaged state via the sheath pipe upon the coupling attained by the coupling means, and the inner lid is configured to close the first flow channel in a second engaged state allowing the second locking projection to be pinched and held by the outer peripheral surface of the blast pipe on a higher side than the first locking projection.

In claim 10, the first closing means is an inner lid configured to fit to the upper end portion of the blast pipe to close the first flow channel, and the inner lid is configured to be pushed upward via the sheath pipe to separate from the upper end portion and open the first flow channel upon the coupling attained by the coupling means.

In claim 11, the blast pipe comprises a first locking projection projecting with a small height from the outer peripheral surface of the blast pipe, and the inner lid comprises an annular second locking projection projecting with a small height from an inner peripheral surface of the inner lid and extending in a circumferential direction, the second locking projection being climbable over the first locking projection. In the pre-coupling state attained by the coupling means, the inner lid is configured to close the first flow channel in a first engaged state allowing the second locking projection to be engaged with the first locking projection on a lower side of the first locking projection.

Effects of the Invention

The present invention separately includes the release means to release the second closing means upon the coupling attained when the extraction cap is coupled with the compressor so as to permit individual opening of the first and second flow channels, as described above. Therefore, the fitting precision between the inner lid as the first closing means and the cap body is relaxed to suppress, for example, the drop in yield rate of the extraction cap and the increase in process costs for the product inspection process. It is also ensured to reliably prevent the occasion that the inner lid comes off to cause leak of the liquid during storage. It is also ensured to reliably prevent the occasion that at the time of use, the inner lid does not come off to make a puncture repair operation inoperable.

BRIEF DESCRIPTION OF THE DRAWINGS

FIGS. 7(A) and 7(B) are partial cross-sectional views illustrating in enlarged dimension first closing means according to other embodiment in the pre-coupling state and in the coupled state.

MODE FOR CARRYING OUT THE INVENTION

An embodiment of the present invention is described in detail below.

Figure 1:
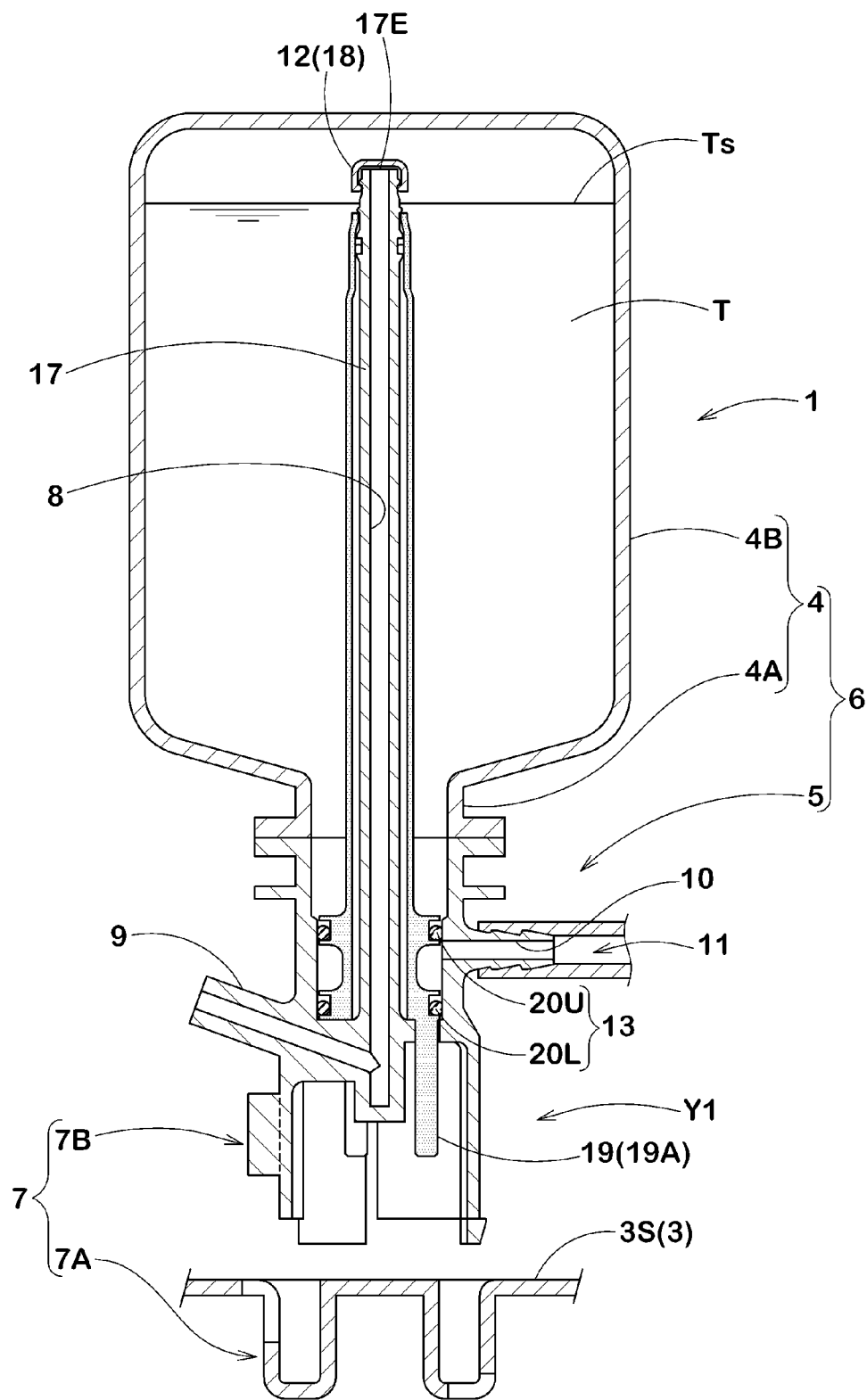
FIG. 1 is a cross-sectional view illustrating a pre-coupling state of a puncture repair kit of the present invention.

FIG. 1 is the cross-sectional view illustrating a pre-coupling state Y1 of a puncture repair kit 1 of the present invention. The puncture repair kit 1 of the present embodiment includes a compressor 3 to discharge compressed air, a bottle unit 6 with an extraction cap 5 attached to a bottle container 4 to store a puncture repair liquid T, and coupling means 7 to couple the compressor 3 and the extraction cap 5 of the bottle unit 6 with each other so as to be integrally secured to each other.

The coupling means 7 includes a compressor side coupling portion 7A defined on the compressor 3, and an extraction cap side coupling portion 7B defined on the extraction cap 5. At the time of a puncture repair, these two portions 7A and 7B are to be coupled with each other to integrally secure the compressor 3 and the bottle unit 6 at a puncture repair site. This prevents the bottle unit 6 from falling down during a puncture repair operation.

The compressor 3 includes a movable portion with a known structure using, for example, a motor, a piston, and a cylinder. In the present embodiment, the compressor side coupling portion 7A is defined on an upper surface 3S of the compressor 3.

The bottle unit 6 includes the bottle container 4 and the extraction cap 5. The bottle container 4 includes a small-diameter cylindrical-shaped mouth portion 4A projected from a lower end of a container portion 4B to store the puncture repair liquid T.

The extraction cap 5 includes an inlet portion 9 to take in the compressed air from the compressor 3, an outlet portion 11 to sequentially take out the puncture repair liquid and the compressed air through a second flow channel 10, and first and second closing means 12 and 13 to respectively close the first and second flow channels 8 and 10. The inlet portion 9 is to take in the compressed air via the first flow channel 8 into the bottle container 4. The outlet portion 11 is to take out the puncture repair liquid and the compressed air from the bottle container 4 upon an intake of the compressed air. The first and second closing means 12 and 13 are to respectively close the first and second flow channels 8 and 10 in the pre-coupling state Y1 attained by the coupling means 7. The extraction cap 5 also includes release means 19 to release the second closing means 13 to open the second flow channel 10 upon the coupling attained by the coupling means 7.

Figure 2:
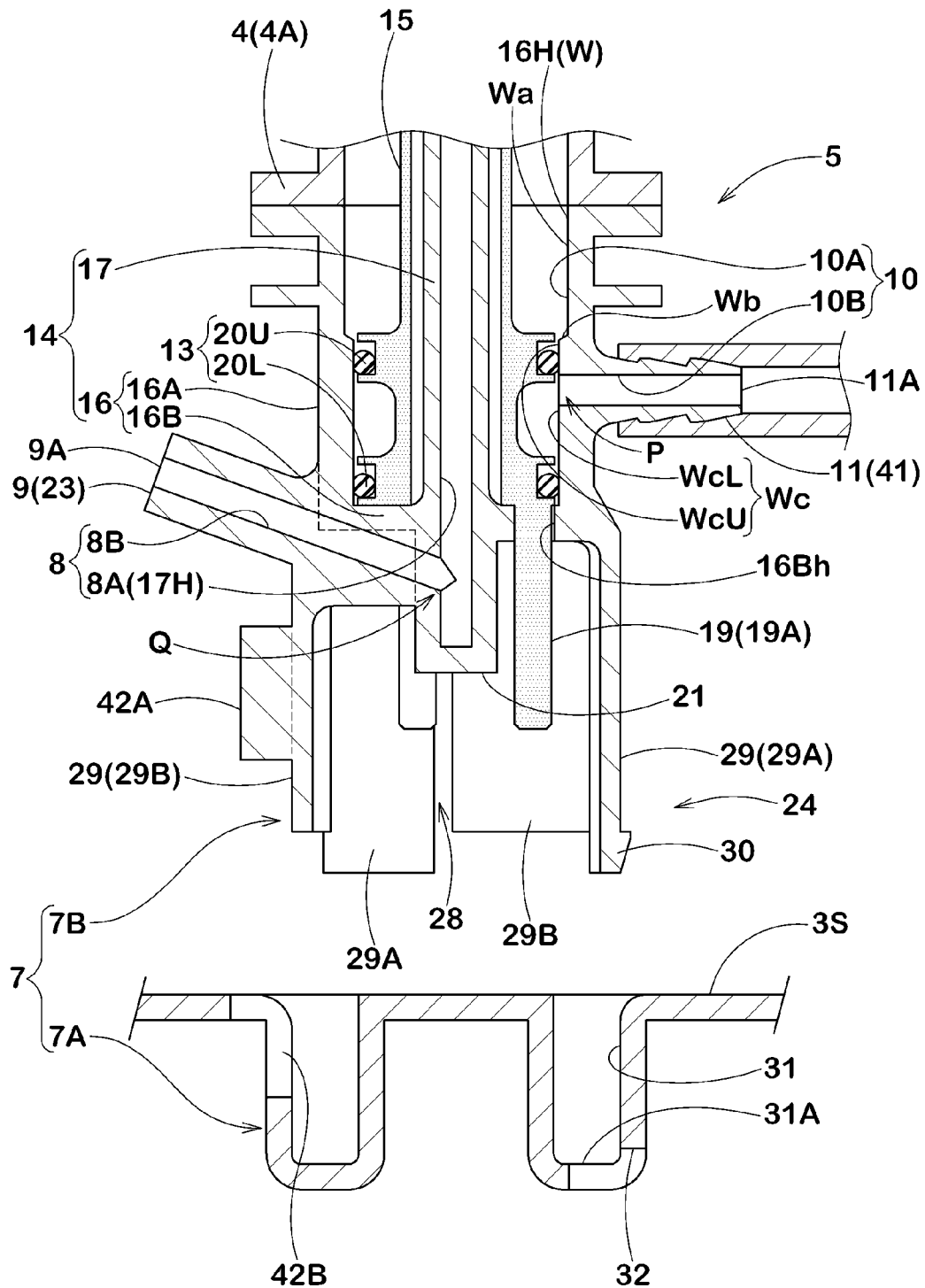
FIG. 2 is a partial cross-sectional view illustrating in enlarged dimension a main part of the puncture repair kit.

Specifically, the extraction cap 5 of the present embodiment is configured including a cap body 14 and a sheath pipe 15 as illustrated in enlarged dimension in FIG. 2. The cap body 14 integrally includes a barrel portion 16 including a tubular portion 16A whose upper end is to be air-tightly fitted in the mouth portion 4A of the bottle container 4, and a bottom portion 16B joining a lower end of the tubular portion 16A, and a blast pipe 17 extending upward from the bottom portion 16B. An inner hole 16H of the tubular portion 16A communicates with the inside of the bottle container 4.

The present embodiment illustrates the case where the mouth portion 4A and the tubular portion 16A are secured to each other by deposition. The mouth portion 4A and the tubular portion 16A may be secured to each other with various methods, such as adhesive or screwing.

The blast pipe 17 extends upward and coaxially with the tubular portion 16A, and a center hole 17H of the blast pipe 17 constitutes the first flow channel 8. An inner lid 18 (shown in FIG. 1) to close the first flow channel 8 is to be capped on an upper end portion of the blast pipe 17. That is, the inner lid 18 constitutes the first closing means 12. In the present embodiment, the inner lid 18 is to automatically come off to open the first flow channel 8 under internal pressure of the first flow channel 8 generated by the compressed air from the compressor 3. An upper end 17E of the blast pipe 17 is terminated at a higher position than a liquid surface Ts of the puncture repair liquid T.

In the present embodiment, the first flow channel 8 includes a vertical flow channel portion 8A defined by the center hole 17H, and a lateral flow channel 8B communicating via an intersection Q with the vertical flow channel portion 8A and extending from the intersection Q to a tip opening portion 9A of the inlet portion 9. A lower end of the vertical flow channel portion 8A is closed with a bottom plate portion 21. The bottom plate portion 21 of the present embodiment is located lower than the bottom portion 16B, and is to seat on the upper surface 3S of the compressor 3 to function to stabilize posture in the coupled state Y2 (shown in FIG. 4).

Figure 3:
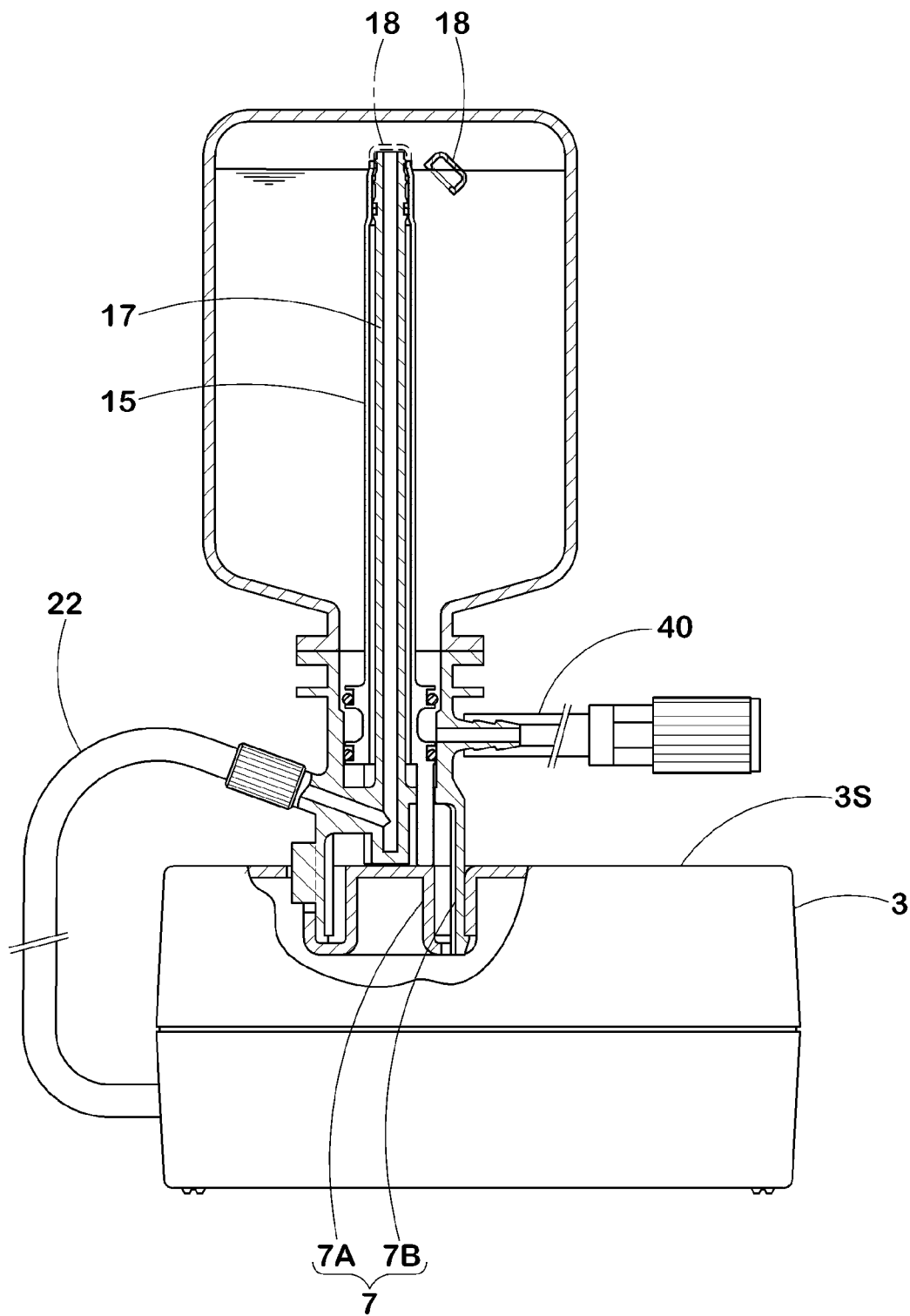
FIG. 3 is a cross-sectional view illustrating a coupled state of the puncture repair kit.

The inlet portion 9 is defined projecting outward from the tubular portion 16A as a hose connection portion 23 to be connectable to one end of a compressed air connection hose 22 (shown in FIG. 3), the other end of which is to be connected to the compressor 3. Thereby, the compressor 3 is usable not only for the puncture repair but also for the purposes of charging air into, for example, an air mattress, a swimming ring, or the like.

The sheath pipe 15 is externally inserted in and held on the blast pipe 17 so as to be slidable up and down. In the present embodiment, the sheath pipe 15 includes the second closing means 13 to close the second flow channel 10, and the release means 19 to release the second closing means 13.

The release means 19 includes, for example, three projection pieces for release 19A extending from a lower end of the sheath pipe 15 and projecting downward through the bottom portion 16B. A through hole 16Bh to allow the projection pieces for release 19A to pass therethrough is drilled through the bottom portion 16B. The projection pieces for release 19A are to come into contact with the upper surface 3S of the compressor 3 to push upward the sheath pipe 15 upon the coupling attained by the coupling means 7.

Here, the second flow channel 10 includes an annular vertical flow channel portion 10A defined by a gap between the sheath pipe 15 and the tubular portion 16A, and a lateral flow channel portion 10B to communicate via an intersection P with the vertical flow channel portion 10A and extending from the intersection P to a tip opening portion 11A of the outlet portion 11. The outlet portion 11 is defined projecting outward from the tubular portion 16A, as a connection portion 41 of a hose 40 to inject the puncture repair liquid T and the compressed air to a tire. The hose 40 is wound around the tubular portion 16A and stored there.

An inner wall surface W of the tubular portion 16A includes a large-diameter wall portion Wa allowing the inner hole 16H to define a large diameter, and a small-diameter wall portion Wc to communicate via a step portion Wb with a lower side of the large-diameter wall portion Wa. The large-diameter wall portion Wa is defined at a higher position than the intersection P. Therefore, the small-diameter wall portion Wc is divided into an upper small-diameter wall portion WcU between the step portion Wb and the intersection P, and a lower small-diameter wall portion WcL on a lower side than the intersection P.

The second closing means 13 includes upper and lower ring-shaped seal members 20U and 20L disposed integrally movably on the sheath pipe 15 and respectively to come into contact with the small-diameter wall portion Wc to close the vertical flow channel portion 10A on a higher side and a lower side than the intersection P. The seal members 20U and 20L of the present embodiment are respectively so-called O-rings and held by circumferential grooves defined on an outer periphery of the sheath pipe 15.

In the second closing means 13, the upper seal member 20U is to come into contact with the upper small-diameter wall portion WcU to close the second flow channel 10 in the pre-coupling state Y1 (shown in FIG. 2), thereby preventing the puncture repair liquid T from flowing out to the outlet portion 11. In a coupled state Y2 (shown in FIG. 4), the upper seal member 20U is to move upward beyond the step portion Wb by an upward push against the sheath pipe 15 applied by the projection piece for release 19A. At this time, a gap G is defined between the upper seal member 20U and the large-diameter wall portion Wa, thus allowing the second flow channel 10 to open.

Figure 5A:
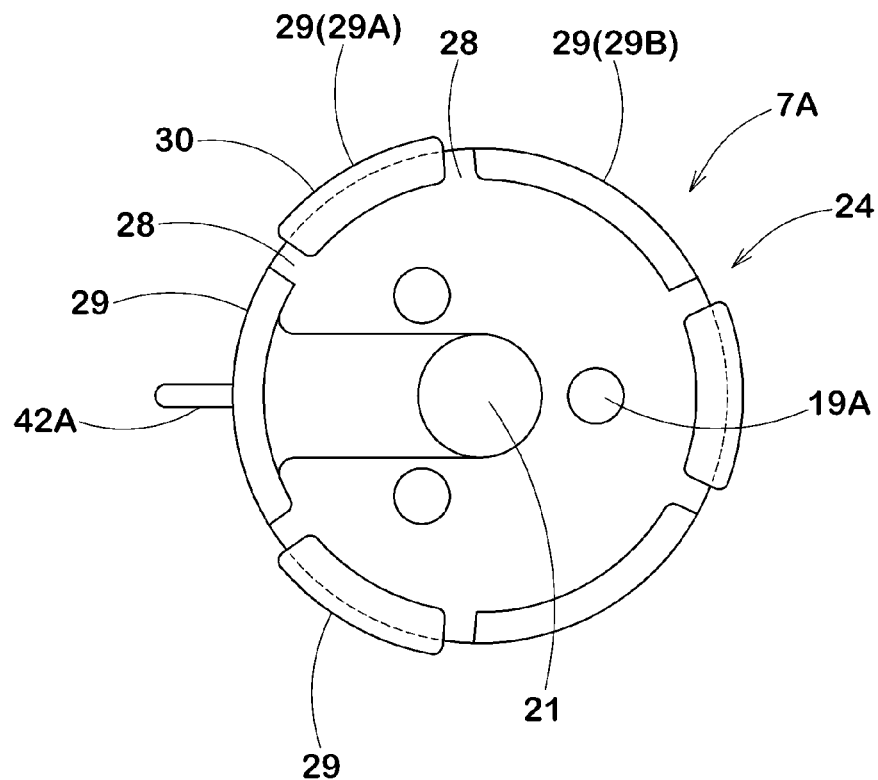
FIG. 5(A) is a bottom view of an extraction cap side coupling portion as viewed from below.
Figure 5B:
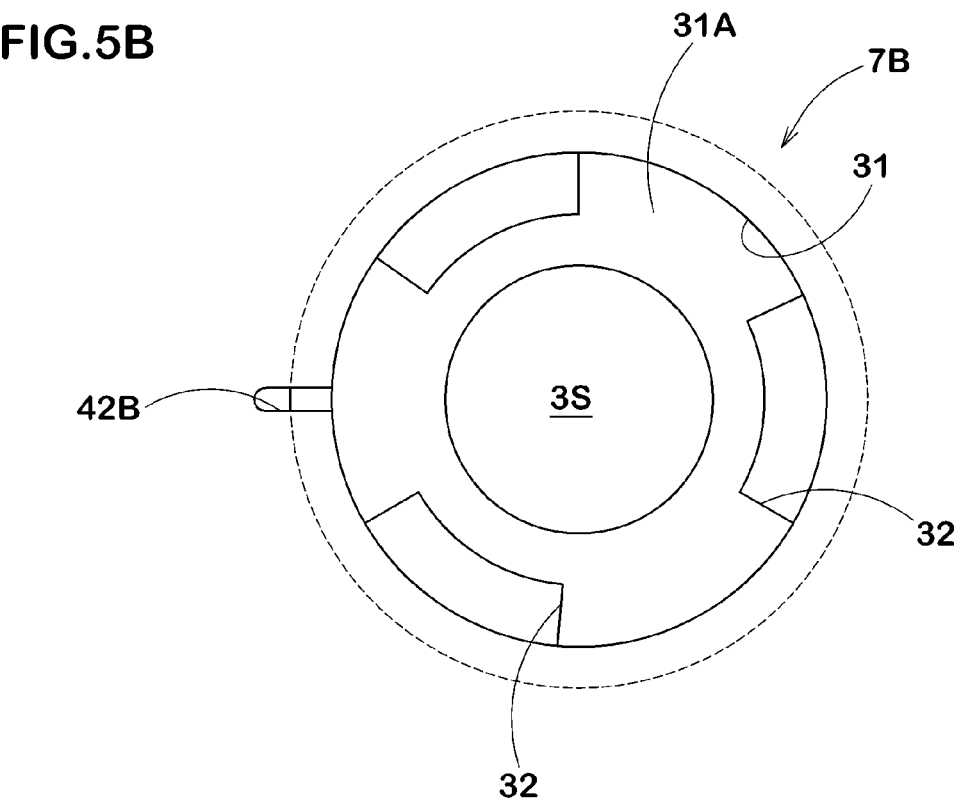
FIG. 5(B) is a top view of a compressor side coupling portion as viewed from above.

The coupling means 7 includes the compressor side coupling portion 7A and the extraction cap side coupling portion 7B as described above. In the present embodiment, the extraction cap side coupling portion 7B includes a tubular projected portion 24 projecting downward from the bottom portion 16B as shown in FIGS. 2 and 5. The projected portion 24 is divided by a vertically extending slit 28 into a plurality of, specifically six projection pieces 29 having spring elasticity in the present embodiment. At least two, specifically three in the present invention, of these projection pieces 29 are defined as a first projection piece 29A with an approximately right-angled triangle shaped hook portion 30 projecting outward at a lower end of the first projection piece 29A, and the rest is defined as a second projection piece 29B without the hook portion.

On the other hand, the compressor side coupling portion 7A is defined as an annular coupling groove 31 that permits fitting of the tubular projected portion 24. A claw engaging hole 32 to be engaged with and locked to the hook portion 30 is defined in a groove bottom 31A of the coupling groove 31.

Figure 4:
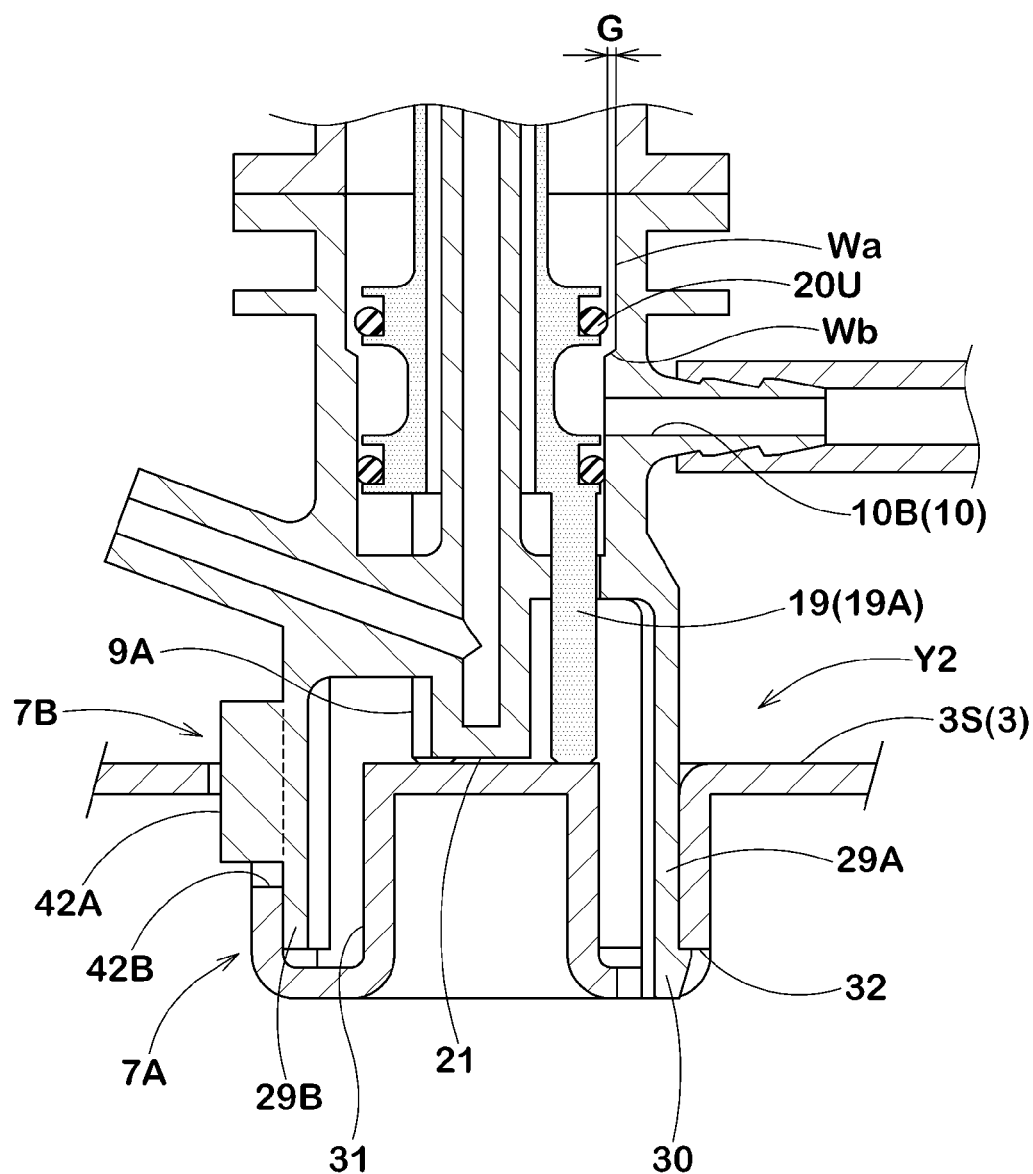
FIG. 4 is another partial cross-sectional view illustrating in enlarged dimension the main part of the puncture repair kit.

Here, outer surfaces of the first and second projection pieces 29A and 29B can be brought into press contact with an inner surface of the coupling groove 31 by the spring elasticity, and a lower end of the projection piece 29B is to be held on the groove bottom 31A of the coupling groove 31. In the first projection piece 29A, the hook portion 30 thereof is to be engaged with and locked to the claw engaging hole 32 of the coupling groove 31. This ensures a strong one-touch coupling between the compressor 3 and the bottle unit 6. Reference numeral 42A in FIG. 4 is a projection for positioning that is projected on each of the projection pieces 29, and the projection is to be inserted into a groove 42 disposed in the inner surface of the coupling groove 31 to perform positioning for a rotation direction.

Figure 6A:
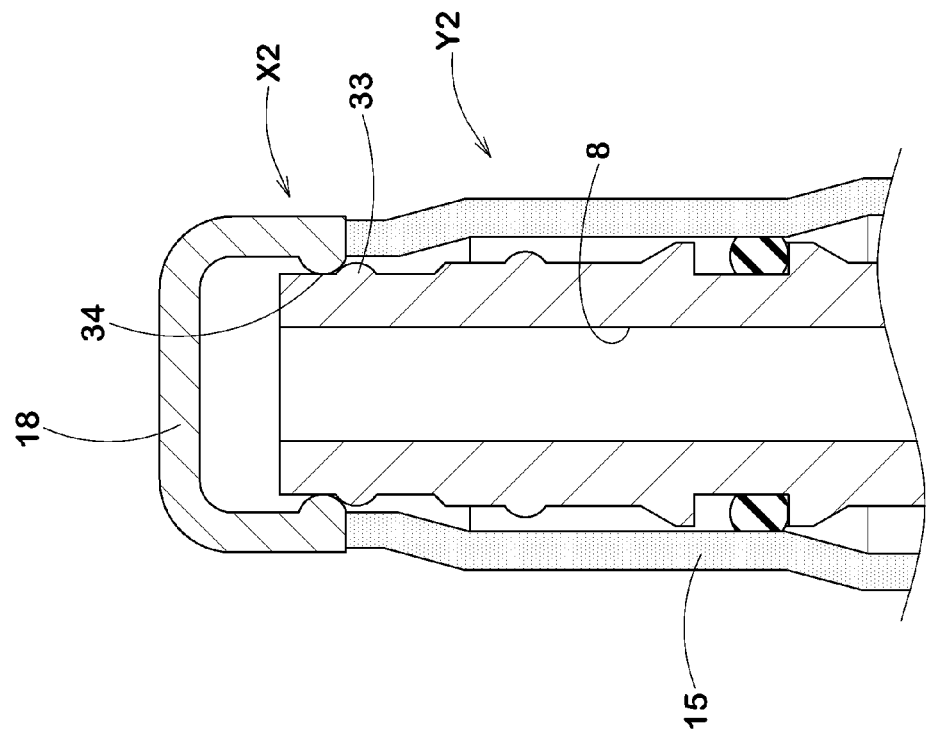
FIGS. 6(A) and 6(B) are partial cross-sectional views illustrating in enlarged dimension first closing means in the pre-coupling state and in the coupled state.
Figure 6B:
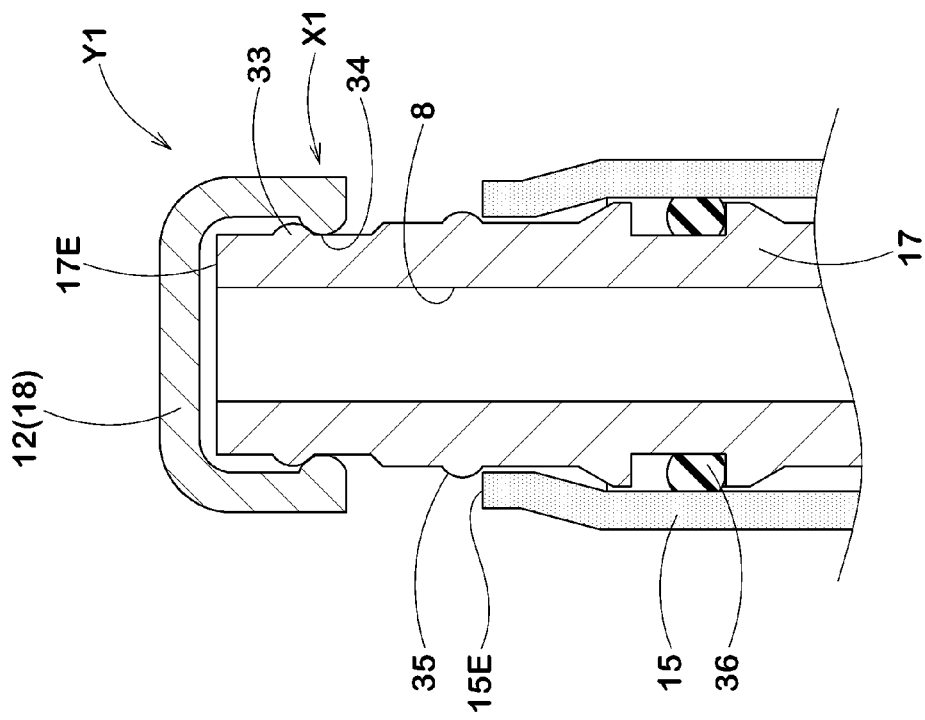
Figure 8:
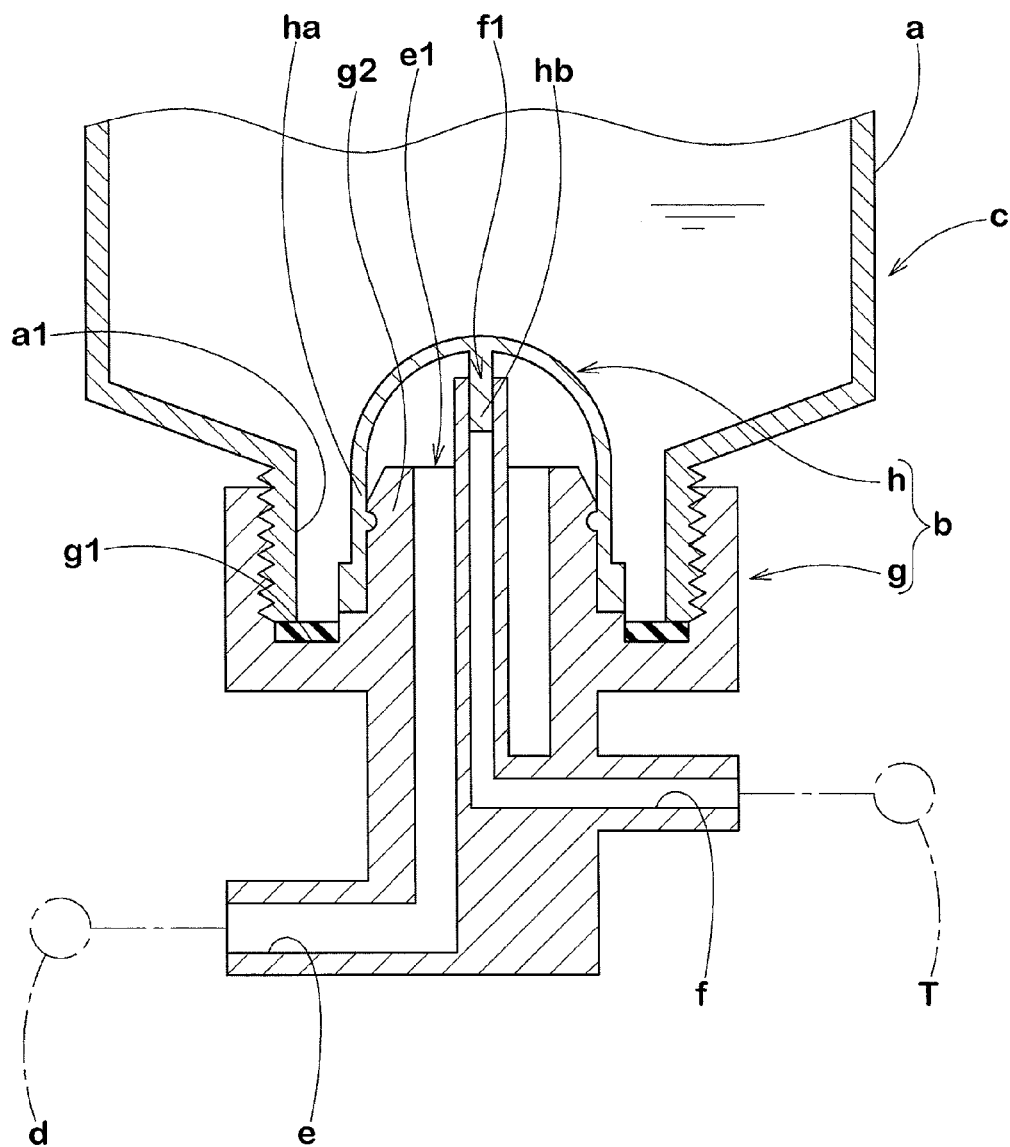
FIG. 8 is a cross-sectional view illustrating a conventional extraction cap.

As shown in FIGS. 6(A) and 6(B), the blast pipe 17 of the present embodiment includes a first locking projection 33 projecting with a small height from an outer peripheral surface of the blast pipe 17 at a position retracted from the upper end 17E of the blast pipe 17. The inner lid 18 extends in a circumferential direction thereof while projecting with a small height on an inner peripheral surface thereof. The inner lid 18 includes an annular second locking projection 34 that is climbable over the first locking projection 33. In the pre-coupling state Y1 attained by the coupling means 7, the inner lid 18 is to close an upper end of the first flow channel 8 in a first engaged state X1 allowing the second locking projection 34 to engage with the first locking projection 33 on a lower side of the first locking projection 33.

In the pre-coupling state Y1, an upper end 15E of the sheath pipe 15 is located lower than the inner lid 18 in the first engaged state X1. A third locking projection 35 is defined at this location on an outer periphery of the blast pipe 17. Consequently, an upper end position of the sheath pipe 15 is regulated to prevent the sheath pipe 15 from coming into contact with the inner lid 18 in the pre-coupling state Y1. A seal ring 36, such as an O-ring, to seal between the blast pipe 17 and the sheath pipe 15, is attached to the blast pipe 17.

On the other hand, in the coupled state Y2, the inner lid 18 is to be pushed upward from the first engaged state X1 via the sheath pipe 15 as shown in FIG. 6(B), and the second locking projection 34 is to close the upper end of the first flow channel 8 in a second engaged state X2 lying on a higher side than the first locking projection 33. A shift from the first engaged state X1 to the second engaged state X2 is performable owing to the fact that the second locking projection 34 climbs over the first locking projection 33. In the second engaged state X2, the inner lid 18 is to be held only owing to the fact that the second locking projection 34 pinches the outer peripheral surface of the blast pipe 17. Therefore, the easy, reliable separation is attainable under the internal pressure of the first flow channel 8 generated by the compressed air. On the other hand, in the first engaged state X1, the second locking projection 34 is to engage with the first locking projection 33 to ensure a strong attachment.

Thus, the puncture repair kit 1 of the present embodiment is to include the coupling means 7 to allow the unstable bottle unit 6 to be integrally coupled with and secured to the compressor 3. It is therefore ensured to prevent the falling of the bottle unit 6 during the puncture repair operation.

The release means 19 to release the second closing means 13 is separately disposed to individually open the first and second flow channels 8 and 10. Therefore, only variations in fitting between the inner lid 18 as the first closing means 12 and the blast pipe 17 needs consideration. That is, It is ensured to reduce the variations in fitting by half than that in conventional one. It is also capable of relaxing the fitting precision to suppress, for example, the drop in yield rate of the extraction cap and the increase in process costs for the product inspection process. Particularly, according to the present embodiment, the first and second locking projections 33 and 34 are disposed to attach, in the pre-coupling state Y1, the inner lid 18 in the strong first engaged state X1. Hence, the liquid leakage during storage can be reliably prevented. In the coupled state Y2, the inner lid 18 is to enter the weak second engaged state X2. Hence, the inner lid 18 can be easily and reliably separated under air pressure of the compressed air during the puncture repair. Additionally, the first and second engaged states X1 and X2 are switched in conjunction with the coupling attained by the coupling means 7, thus achieving reliable performance.

The sheath pipe 15 is externally inserted in and held on the blast pipe 17 serving as the first flow channel 8, and the second closing means 13 and the release means 19 are disposed on the sheath pipe 15. Consequently, the shift from the first engaged state X1 to the second engaged state X2, and the release of the second closing means 13 (the opening of the second flow channel 10) are reliably operable in conjunction with the coupling attained by the coupling means 7.

The upper end 17E of the blast pipe 17 is preferably located higher than the liquid surface Ts of the puncture repair liquid T, as in the present embodiment. The reason for this is as follows. If the compressor 3 is operated with the second flow channel 10 side closed, the pressure in the bottle container 4 is abnormally enhanced, and the compressor 3 is subjected to pulsation. In this case, there occurs a risk that the puncture repair liquid T in the bottle container 4 flows back toward the compressor 3. In this regard, the above trouble is preventable by locating the upper end 17E higher than the liquid surface Ts. The state that the second flow channel 10 side is closed can correspond to, for example, the case where the inner lid 18 does not come off due to a defect of the second closing means 13, the case where the hose 40 to be connected to the outlet portion 11 is bent and blocked, or the case where the tip of the hose 40 is blocked by the cap.

FIGS. 7(A) and 7(B) respectively illustrate other embodiment of the extraction cap 5. In the present embodiment, the distance between the first and third locking projections 33 and 35 is short. Consequently, in the pre-coupling state Y1, the lower end of the inner lid 18 and the upper end 15E of the sheath pipe 15 are close to each other. Therefore, as shown in FIG. 7(B), during the coupling by the coupling means 7, the inner lid 18 is pushed upward via the sheath pipe 15, and is separated from the upper end portion of the blast pipe 17 to open the first flow channel 8.

DESCRIPTION OF THE REFERENCE NUMERAL

1 Puncture repair kit
3 Compressor
4 Bottle container
4A Mouth portion
5 Extraction cap
6 Bottle unit
7 Coupling means
8 First flow channel
9 Inlet portion
10 Second flow channel
10A Vertical flow channel portion
10B Lateral flow channel portion
11 Outlet portion
11A Tip opening portion
12 First closing means
13 Second closing means
14 Cap body
15 Sheath pipe
16 Barrel portion
16A Tubular portion
16B Bottom portion
16H Inner hole
17 Blast pipe
17H Center hole
18 Inner lid
19 Release means
19A Projection piece for release
20U Upper seal member
20L Lower seal member
33 First locking projection
34 Second locking projection
T Puncture repair liquid
Ts Liquid surface
X1 First engaged state
X2 Second engaged state
Y1 Pre-coupling state
Y2 Coupled state
Wa Large-diameter wall portion
Wb Step portion
Wc Small-diameter wall portion

The invention claimed is:

1. A puncture repair kit comprising:
a compressor configured to discharge compressed air;
a bottle unit comprising a bottle container configured to store a puncture repair liquid and an extraction cap attached to a mouth portion of the bottle container; and
coupling means for coupling the compressor and the extraction cap of the bottle unit with each other so as to be integrally secured to each other,
wherein the extraction cap comprises an inlet portion configured to take in the compressed air from the compressor through a first flow channel into the bottle container, an outlet portion configured to sequentially take out the puncture repair liquid and the compressed air from the bottle container through a second flow channel by an intake of the compressed air, and first and second closing means for respectively closing the first and second flow channels in a pre-coupling state attained by the coupling means,
wherein the inlet portion is defined as a hose connection portion configured to be connectable to one end of a compressed air connection hose comprising another end of which is configured to be connected to the compressor, and
wherein the extraction cap comprises release means for releasing the second closing means to open the second flow channel in response to the coupling attained by the coupling means, said extraction cap comprising a cap body integrally comprising a barrel portion comprising an upper end, a lower end, and a tubular portion therebetween, the upper end configured to fit in the mouth portion of the bottle container, the lower end configured to include a bottom portion, the tubular portion comprising an inner hole communicating with an inside of the bottle container, and a blast pipe extending upward from the bottom portion and coaxially with the tubular portion, the blast pipe comprising a center hole serving as the first flow channel, and a sheath pipe externally inserted in and held on the blast pipe in a vertically slidable manner, and
the second closing means is disposed in the sheath pipe so as to be integrally movable with the sheath pipe, and the inlet portion is projected outward on the tubular portion.

2. The puncture repair kit according to claim 1, wherein the release means comprises a projection piece for release extending from a lower end of the sheath pipe and projecting downward through the bottom portion, and the release means is configured to release the second closing means due to the projection piece for release coming into contact with the compressor to push upward the sheath pipe in response to the coupling attained by the coupling means.

3. The puncture repair kit according to claim 1,
wherein the second flow channel comprises an annular vertical flow channel portion defined by a gap between the sheath pipe and the tubular portion, and a lateral flow channel portion configured to communicate via an intersection (P) with the vertical flow channel portion and extend from the intersection (P) to a tip opening portion of the outlet portion, and
wherein the tubular portion comprises a large-diameter wall portion allowing the inner hole to define a large diameter, and a small-diameter wall portion configured to communicate via a step portion with a lower side of the large-diameter wall portion, and the large-diameter wall portion is defined at a higher position than the intersection (P).

4. The puncture repair kit according to claim 3, wherein the second closing means comprises upper and lower seal members integrally movably disposed on the sheath pipe and configured to respectively come into contact with the small-diameter wall portion to close the vertical flow channel on a higher side and a lower side than the intersection (P), and the upper seal member defines a gap between the upper seal member and the large-diameter wall portion to open the second flow channel when the upper seal member is moved upward beyond the step portion by an upward push against the sheath pipe.

5. The puncture repair kit according to claim 1, wherein an upper end of the blast pipe is located higher than a liquid surface of the puncture repair liquid.

6. The puncture repair kit according to claim 1, wherein the first closing means is an inner lid configured to attach to an upper end portion of the blast pipe which closes the first flow channel, the inner lid further configured to open the first flow channel by detaching from the blast pipe due to internal pressure of the first flow channel generated by the compressed air from the compressor.

7. The puncture repair kit according to claim 6,
wherein the blast pipe comprises a first locking projection projecting with a small height from an outer peripheral surface of the blast pipe at a position retreated from the upper end of the blast pipe, and the inner lid comprises an annular second locking projection projecting with a small height from an inner peripheral surface of the inner lid and extending in a circumferential direction, the second locking projection being climbable over the first locking projection, and
wherein in a pre-coupling state attained by the coupling means, the inner lid is configured to close the first flow channel in a first engaged state allowing the second locking projection to be engaged with the first locking projection on a lower side of the first locking projection.

8. The puncture repair kit according to claim 7, wherein the inner lid is configured to be pushed upward from the first engaged state via the sheath pipe in response to the coupling attained by the coupling means, and the inner lid is configured to close the first flow channel in a second engaged state allowing the second locking projection to be pinched and held by the outer peripheral surface of the blast pipe on a higher side than the first locking projection.

9. The puncture repair kit according to claim 1, wherein the first closing means is an inner lid configured to fit to the upper end portion of the blast pipe to close the first flow channel, and the inner lid is configured to be pushed upward via the sheath pipe to separate from the upper end portion and open the first flow channel upon the coupling attained by the coupling means.

10. The puncture repair kit according to claim 9,
wherein the blast pipe comprises a first locking projection projecting with a small height from the outer peripheral surface of the blast pipe, and the inner lid comprises an annular second locking projection projecting with a small height from an inner peripheral surface of the inner lid and extending in a circumferential direction, the second locking projection being climbable over the first locking projection, and
wherein in a pre-coupling state attained by the coupling means, the inner lid is configured to close the first flow channel in a first engaged state allowing the second locking projection to be engaged with the first locking projection on a lower side of the first locking projection.

11. The puncture repair kit according to claim 2,
wherein the second flow channel comprises an annular vertical flow channel portion defined by a gap between the sheath pipe and the tubular portion, and a lateral flow channel portion configured to communicate via an intersection (P) with the vertical flow channel portion and extend from the intersection (P) to a tip opening portion of the outlet portion, and
wherein the tubular portion comprises a large-diameter wall portion allowing the inner hole to define a large diameter, and a small-diameter wall portion configured to communicate via a step portion with a lower side of the large-diameter wall portion, and the large-diameter wall portion is defined at a higher position than the intersection (P).

12. The puncture repair kit according to claim 2, wherein an upper end of the blast pipe is located higher than a liquid surface of the puncture repair liquid.

13. The puncture repair kit according to claim 3, wherein an upper end of the blast pipe is located higher than a liquid surface of the puncture repair liquid.

14. The puncture repair kit according to claim 4, wherein an upper end of the blast pipe is located higher than a liquid surface of the puncture repair liquid.

15. The puncture repair kit according to claim 2, wherein the first closing means is an inner lid configured to attach to an upper end portion of the blast pipe which closes the first flow channel, the inner lid further configured to open the first flow channel by detaching from the blast pipe due to internal pressure of the first flow channel generated by the compressed air from the compressor.

16. The puncture repair kit according to claim 3, wherein the first closing means is an inner lid configured to attach to an upper end portion of the blast pipe which closes the first flow channel, the inner lid further configured to open the first flow channel by detaching from the blast pipe due to internal pressure of the first flow channel generated by the compressed air from the compressor.

17. The puncture repair kit according to claim 4, wherein the first closing means is an inner lid configured to attach to an upper end portion of the blast pipe which closes the first flow channel, the inner lid further configured to open the first flow channel by detaching from the blast pipe due to internal pressure of the first flow channel generated by the compressed air from the compressor.

18. The puncture repair kit according to claim 5, wherein the first closing means is an inner lid configured to attach to an upper end portion of the blast pipe which closes the first flow channel, the inner lid further configured to open the first flow channel by detaching from the blast pipe due to internal pressure of the first flow channel generated by the compressed air from the compressor.

19. The puncture repair kit according to claim 2, wherein the first closing means is an inner lid configured to fit to the upper end portion of the blast pipe to close the first flow channel, and the inner lid is configured to be pushed upward via the sheath pipe to separate from the upper end portion and open the first flow channel upon the coupling attained by the coupling means.

* * * * *